Jan. 17, 1956  A. DE ANGELIS  2,730,924
OPHTHALMIC MOUNTINGS

Filed Aug. 8, 1950  2 Sheets-Sheet 1

INVENTOR
ARMAND DE ANGELIS
BY
Louis L. Gagnon
ATTORNEY

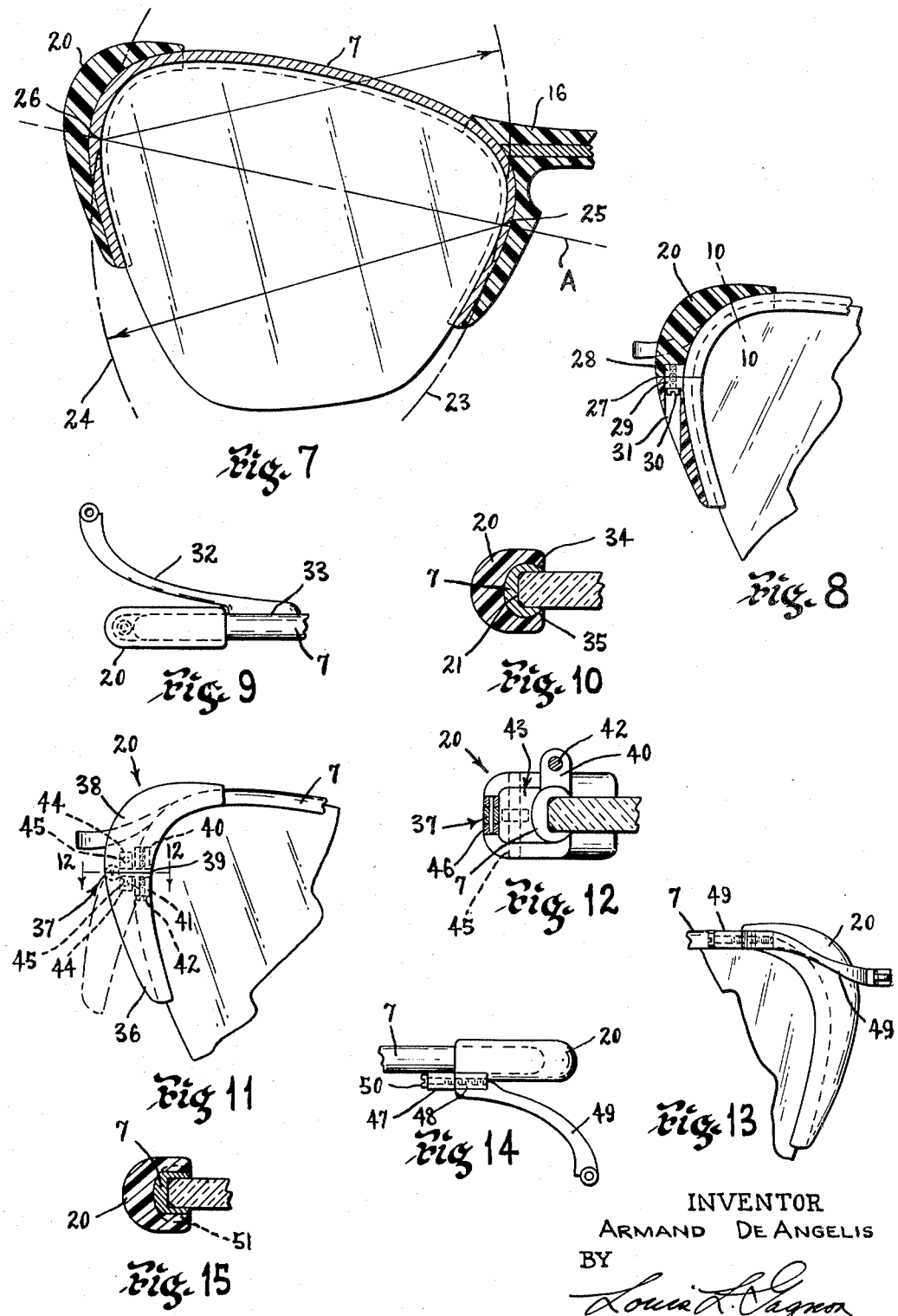

United States Patent Office 2,730,924
Patented Jan. 17, 1956

2,730,924

OPHTHALMIC MOUNTINGS

Armand De Angelis, Southbridge, Mass., assignor to American Optical Company, Southbridge, Mass., a voluntary association of Massachusetts Application August 8, 1950, Serial No. 178,280

2 Claims. (Cl. 88—41)

This invention relates to improvements in ophthalmic mountings and has particular reference to a novel construction of half-frame type mounting.

One of the principal objects of the invention is to provide an ophthalmic mounting of the above character wherein the assembling of the lenses with the supporting structure of such mountings is greatly facilitated and the lenses are firmly held against displacement and with little danger of breakage.

Another object is to provide an ophthalmic mounting of the above character having its rim sections in the form of inverted U-shaped members each having a longitudinal groove extending throughout the length of the underside thereof, with the space between the depending branches of said rim sections being less than the greatest width of the upper portions of the lenses to be fitted therebetween whereby the lenses may be quickly and easily assembled with the rims and firmly held against displacement.

Another object is to provide a main metallic supporting structure having resilient rim sections so shaped as to have a pressure-gripping action with the upper portions of the lenses to retain said lenses in said supporting structure and further having non-metallic portions adjacent the nasal and temporal sides thereof for increasing the rigidity of said rim sections at said locations and being controllable as to color and contour shape for decorative purposes.

Another object is to provide an ophthalmic mounting of the above character having novel mechanical means for detachably retaining the lenses in assembled relation with the supporting structure of the mounting and which will readily permit the replacement or interchanging of lenses.

Other objects and advantages of this invention will become apparent from the following description taken in conjunction with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Referring to the drawings:

Fig. 7 is a fragmentary front elevational view shown partially in section diagrammatically illustrating the lens retaining characteristics of the mounting;

Fig. 8 is a fragmentary sectional view of a modified form of the temporal portion of the mounting;

Fig. 9 is a top plan view of the portion of the mounting illustrated in Fig. 8;

Fig. 10 is an enlarged fragmentary sectional view taken on line 10—10 of Fig. 8;

Fig. 11 is a view generally similar to Fig. 8 of a further modification of the invention;

Fig. 12 is an enlarged sectional view taken on line 12—12 of Fig. 11;

Fig. 13 is a fragmentary rear view of a further modification of the temporal portion of the mounting;

Fig. 14 is a top plan view of Fig. 13; and

Fig. 15 is a view generally similar to Fig. 10 of a further modification.

Figure 2:
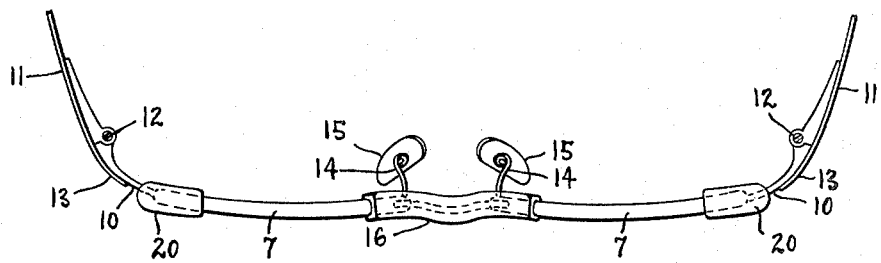
Fig. 2 is a plan view of the mounting shown in Fig. 1.
Figure 3:
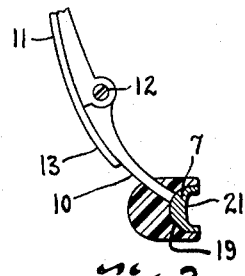
Fig. 3 is an enlarged fragmentary sectional view taken as on line 3—3 of Fig. 1 and looking in the direction indicated by the arrows.
Figure 5:
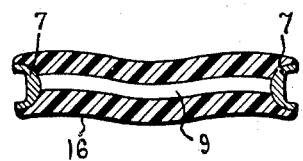
Fig. 5 is an enlarged fragmentary sectional view taken on line 5—5 of Fig. 1 and looking in the direction indicated by the arrows.
Figure 6:
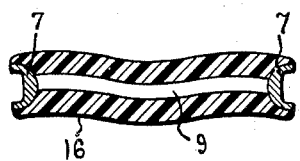
Fig. 6 is an enlarged sectional view taken as on line 6—6 of Fig. 1.

Referring more particularly to the drawings wherein like characters of reference designate like parts throughout the several views, the mounting embodying the invention comprises a pair of rim sections 7 preferably formed of metal such, for example, as stainless steel, nickel-gold filled, beryllium copper or other suitable metal having a resilient nature and having a U-shaped cross-section as shown in Figs. 3, 5 and 6. The said rim sections 7 are shaped substantially to the upper contour shape of the lenses 8 and are adapted to extend downwardly of the temporal and nasal sides of said lenses in converging relation with each other. It is particularly pointed out that the nasal and temporal edges of the lenses are similarly provided with converging sides whereby the distance between the lower ends of the depending portions of the rim sections will be less than the maximum width of the upper portions of the lenses whereby the rims will grip and hold the lenses when positioned therein. The lenses are of greatest width along a line A above the geometrical centers thereof. The rim sections 7 are joined by a metallic bar member 9 which supports them in desired spaced relation with each other. Said rim sections, on the temporal sides thereof, are provided with long and slender outwardly and rearwardly extending adjustable endpiece or temple supporting portions to which the temples 11 are pivotally attached as at 12. The said temples are provided with forwardly extending end portions 13 which are adapted to overlie a major portion of the endpieces or temple supports 10 when the temples are extended as illustrated in Figs. 2 and 3 to limit the outward pivotal movement thereof. The bar member 9 and endpieces or temple supports 10 are respectively secured to the metallic rim sections as by soldering, welding or the like.

As shown best in Figs. 2 and 5, the said rim sections 7 have rearwardly extending adjustable nose pads 14 secured as by welding, soldering or the like, and to which the nose pads 16 may be rigidly or pivotally connected as desired.

Figure 1:
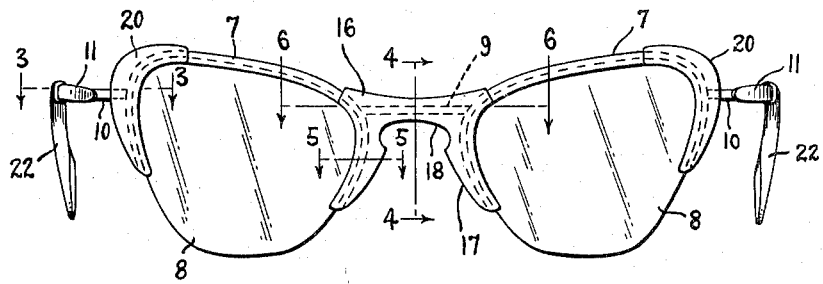
Fig. 1 is a front elevational view.
Figure 4:
Fig. 4 is an enlarged fragmentary sectional view taken on line 4—4 of Fig. 1 and looking in the direction indicated by the arrows.

The bar member 9 and the adjacent portions of the rim sections 7 are provided with a covering of non-metallic material 16 which completely surrounds the bar member 9 as illustrated in Figs. 4 and 6 and partly surrounds the adjacent rim sections 7 as illustrated in Figs. 1, 3 and 5. It is to be noted that the non-metallic covering 16 extends only slightly above the bar member 9 and terminates adjacent the ends of said bar member and has portions extending downwardly throughout the length of the adjacent depending portions of the rim sections 7. The said covering is provided with a nasal recess 17 and has a cutout area 18 for clearance with the bridge portion of the nose. The covering 16 extends about the bar 9 and the nasal portions of the adjacent rim sections. To secure said covering to the rim sections, a coating of a suitable cement may be formed throughout the engaging surfaces thereof, as illustrated at 19 in Figs. 3 and 5. The type of cement used will depend upon the nature of the non-metallic material employed, for example, if the non-metallic material is an acetate, a cement of an acetate type will be employed, if it is nitrate, a cellulose nitrate dissolved in a suitable solvent may be employed etc. The said non-metallic materials may be any of the known types and the cement may be any of the known types useable with said particular plastics.

The temporal portions of the rim sections 7 are provided with a non-metallic covering 20 shaped to overlie the adjacent sections of the rim portions and to overlie the attached end of the long and slender adjustable endpieces or temple supports 10. Like the portions of the member 16 overlying the rim sections, the said non-metallic material 20 may be cemented or otherwise secured to said rim sections or may be held in place by the embedded portions of the rims and the endpieces or temple supports.

The non-metallic portions 16 and 20, which overlie the nasal and temporal sides of the rim sections 7, function as stiffening means for retaining said sides in preformed shapes, the said shapes being those of the adjacent contour shapes of the sides of the lenses. The rim sections 7, intermediate said portions 16 and 20, therefore, will be of a resiliency sufficient to cause said nasal and temporal portions to have a firm gripping and holding action with the lenses.

While the portions 16 and 20 function as stiffening means, it is also pointed out that they afford means by which decorative treatment may be applied either as to contour shapes, color and surface configurations.

The portions 16 and 20 may be applied to the metallic supporting structure as by molding said non-metallic material about the bridge bar 9 and temple supports or endpieces 10 and to the shapes desired or by forming the said portions in divided sections which may thereafter be cemented about said bridge bar and temple supports or endpieces.

To assemble the lenses with the supporting structure of the present device, all that is necessary is to press the lenses inwardly between the depending portions of the rim sections to a position wherein the upper contour edges thereof are seated within the grooves 21. The resilient gripping action of the rims firmly hold the lenses and the said grooves 21 prevent tilting thereof.

As shown in Fig. 7, this gripping action is introduced by controlling the shape of the lens whereby the depending portions of the supporting structure at the nasal and temporal sides of the lens, when assembled therewith, will grip the lens with a tong-like action in response to the resiliency of the intermediate portion 7. It is particularly pointed out that the upper nasal and temporal edge portions of the lens converge in a downward direction along lines lying inwardly of arcs 22 and 23 about which the said respective sides of the lens would move in response to a force pulling said lens outwardly from between said depending portions as applied either on the nasal or temporal side of the lens whereby the lens would tend to rotate about an effective center 25 or 26.

In Figs. 8, 9, and 10, there is shown a slight modification wherein the temporal portions of the rim sections are divided, as illustrated at 27, and are provided with perforated lugs 28 and 29, one of which has a threaded bore for receiving a connection screw 30 by which the lower divided portion of the rim section may be secured to the upper portion thereof. It is particularly pointed out that the non-metallic covering is also provided, along the line 27, with an opening 31 aligned with the lugs 28 and 29 for gaining access to the screw 30. In this construction, the nasal portion of the rim sections would be substantially the same as that shown in Fig. 7 but instead of depending upon the resiliency of the rim portions 7 to enable the lenses to be assembled with the supporting structure and to hold said lenses in position of use, the lower divided section of the rim is removed thereby permitting the lens to be assembled with its upper edge lying within the groove 21 of the rim and by thereafter replacing the lower divided section and tightening the screw 30 to hold the lens in assembled relation with the rim section. In this construction, the temple support or endpiece 32 to which the temple is pivotally attached is secured to the rim section 7 as by soldering or the like along the engaging surfaces 33 at a location inwardly of the non-metallic reinforcement portion 20. In this instance, the rim section 7 is provided with outer curved surfaces 34 and 35 on the opposed sides of the inner groove 21 about which the non-metallic reinforcing member 20 is adapted to be fitted and held in assembled relation with the rim section. This is accomplished by milling a groove or channel in said reinforcing member.

In Figs. 11 and 12, there is illustrated a further modification wherein the depending portion 36, on the temporal side of each rim section, is pivotally connected as illustrated at 37 to the upper portion 38 of said rim section. The said portions 36 and 38 have abutting end surfaces 39 normally held in engaged relation with each other by perforated lugs 40 and 41 disposed on the opposite sides of said engaging surfaces and held in connected relation with each other by a screw or the like 42. The lugs are attached to the rear of the metallic rim section 7, as shown best in Fig. 12, and the reinforcing member 20 is shaped to fit about the said lugs. The parts 36 and 38 are pivotally connected to each other by a hinge member 43. The said hinge member comprises a pair of hinge plates each having a perforated lug 44 shaped to extend within the material of the respective members 36 and 38 and to be secured to said members 36 and 38 by pins or the like 45. The hinge ears overlie the respective adjacent ends of the members 36 and 38 and are pivotally connected with each other by a pin or the like 46. When it is desired to remove or secure a lens to the supporting structure, the screw 42 is loosened and the member 36 is swung outwardly on its pivot 37. The lens is positioned in desired assembled relation with the supporting structure and the screw 42 is then tightened to draw the member 36 in an inward direction about the pivot 37 and thereby secure the lens to the supporting structure. It is to be understood that when the member 36 is in its innermost position, such as shown in full lines in Fig. 11, the distance between the said portion 36 and the nasal depending portion of the rim will be less than the major width of the lens and will thereby hold the lens in assembled relation therewith. It is to be understood that except for the pivot arrangement, the general construction is similar to that shown in Fig. 7.

In Figs. 13 and 14, there is illustrated a further modification wherein the metallic rim section 7 is divided along a line in the plane of the adjacent end surface of the reinforcing member 20 and has tubular members 47 and 48 secured thereto on the opposed sides of the line of division of the rim. The reinforcing member 20 is shaped to fit and interlock with the metallic rim section 7 in a manner similar to that illustrated in Fig. 10.

The temporal support or endpiece 49 is secured to the tubular member 48 which is, in turn, attached to the rim 7 as by soldering, welding or the like. The divided ends of the rim may be secured together by a suitable screw or the like 50 which extends through the tubular member 47 and is threadedly connected with a threaded bore internally of the tubular member 48.

The member 20 may be secured to the temporal side of the rim section as previously described above in connection with the constructions of Figs. 1 through 12. To aid in securing the member 20 to the rim section 7, said section 7 may be provided with a plurality of notches, cuts or the like 51 formed in the opposed sides of said rim section as diagrammatically illustrated in Fig. 15 and into which the material of the reinforcing member 20 will extend when the parts are in assembled relation with each other.

The mountings, in general, provide simple, efficient and economical means for interchangeably supporting lenses.

The temples 11 while having the side portions thereof formed of metal are preferably provided with non-metallic head engaging portions 22 which may be of the same material, color, etc., as the portions 16 and 20.

From the foregoing description, it will be seen that simple, efficient and economical means have been provided for accomplishing all of the objects and advantages of the invention.

Having described my invention, I claim:

1. A lens supporting structure for use with ophthalmic lenses each having their portion of greatest width located above the geometrical center thereof and with the major part of their edge contour above said portion of greatest width arched upwardly along a relatively long and shallow curvature and blending into side edge contours of relatively short radii of curvature on opposed sides thereof to adjacent the termini of said portion of the lenses of greatest width and which in turn then blend into downwardly and inwardly converging nasal and temporal side edge contours, said supporting structure comprising a pair of rim members formed of resilient metallic material and each embodying an intermediate portion of relatively shallow curvature to follow substantially the upper edge portion of the respective lenses when assembled therewith and terminating in downwardly converging nasal and temporal depending portions blending therewith along arcs of relatively short radii of curvature to follow the adjacent side edge contours of the lenses throughout the length of said depending portions when assembled with said lenses, said rim members each having an inwardly disposed channel extending throughout the length thereof for receiving the respective edge portions of the lenses, a bridge of metallic material connecting said rim members at points above the mentioned termini on the nasal sides thereof, and outwardly extending long and slender adjustable temple supports on the temporal sides of said rim members above said termini to which temples may be pivotally connected, said depending nasal and temporal portions of the channelled rim members having their outer surfaces only covered with stiffening members formed of plastic material and to controlled contour shapes, and with said nasal and temporal depending portions of the rim members extending downwardly below said portion of the respective lenses of greatest width a distance greater than the distance between said upper contour edge portion of the rim members and a line connecting the termini of said portion of greatest width and at angles of convergence equal to at least that of said converging side contours of the lenses, said depending portions of the rim members having relatively long areas of edge contact with the lenses when supported thereby.

2. An ophthalmic mounting of the character described comprising a pair of lenses each having continuous uninterrupted edge contours and a pair of continuous uninterrupted surfaces on opposed sides thereof with their portion of greatest width located above the geometrical center thereof and with the major part of their edge contour above said portion of greatest width arched upwardly along a relatively long and shallow curvature and blending into side edge contours of relatively short radii of curvature on opposed sides thereof to adjacent the termini of said portion of the lenses of greatest width and which in turn then blend into downwardly and inwardly converging nasal and temporal side edge contours, a pair of rim members formed of metallic material and each embodying an intermediate portion of relatively shallow curvature to follow substantially the upper edge portion of the respective lenses assembled therewith and terminating in downwardly converging nasal and temporal depending portions blending therewith along arcs of relatively short radii of curvature to follow the adjacent side edge contours of the lenses throughout the length of said depending portions, said rim members each having an inwardly disposed channel extending throughout the length thereof for receiving the respective edge portions of the lenses, a bridge bar connecting said rim members on the nasal sides thereof, a plastic cover portion encasing the bridge bar and overlying the outer surfaces only of the adjacent nasal portions of the rim members, and adjustable temple supports secured to the temporal portions of said rim members to which temples may be pivotally connected, said depending nasal and temporal portions extending downwardly below said portion of the respective lenses of greatest width a distance greater than the distance between said upper contour edge portion of the lenses and a line connecting the termini of said portion thereof of greatest width and at angles of convergence equal to at least that of said converging side contours of the lenses, said nasal and temporal depending portions of the rim members having relatively long uninterrupted areas of edge contact with the lenses.

References Cited in the file of this patent

UNITED STATES PATENTS

| | | |
|---|---|---|
| 674,203 | Gates | May 14, 1901 |
| 2,355,053 | Carlson | Aug. 8, 1944 |
| 2,357,267 | Rohrbach | Aug. 29, 1944 |
| 2,389,742 | Rey | Nov. 27, 1945 |
| 2,495,508 | Cleaver | Jan. 24, 1950 |
| 2,513,214 | Stegeman | June 27, 1950 |
| 2,577,380 | Stegeman | Dec. 4, 1951 |

FOREIGN PATENTS

| | | |
|---|---|---|
| 608,081 | Great Britain | Sept. 9, 1948 |
| 623,706 | Great Britain | May 20, 1949 |
| 965,781 | France | Feb. 22, 1950 |